United States Patent [19]
Seeman, II

[11] 3,895,160
[45] July 15, 1975

[54] FABRIC CONSTRUCTIONS

[76] Inventor: William H. Seeman, II, 4517 S. Johnson St., New Orleans, La. 70125

[22] Filed: May 15, 1972

[21] Appl. No.: 253,340

Related U.S. Application Data

[63] Continuation-in-part of Ser. No. 829,067, May 29, 1969, Pat. No. 3,668,051.

[52] U.S. Cl.............................. 428/232; 156/178
[51] Int. Cl............................................... D03d 17/00
[58] Field of Search........................ 161/140–144, 161/84, 85, 76, 77, 78, 93, 98, 156, DIG. 4; 156/176–179, 436; 9/6

[56] References Cited
UNITED STATES PATENTS

| | | | |
|---|---|---|---|
| 2,787,570 | 4/1957 | Lott et al. | 161/143 |
| 3,077,947 | 2/1963 | Peebles et al. | 161/143 |
| 3,113,061 | 12/1963 | Donaldson | 161/143 |
| 3,313,674 | 4/1967 | Mathews | 161/143 |
| 3,472,730 | 10/1969 | Frigstad | 161/144 |
| 3,562,082 | 2/1971 | Van Bushirn | 161/76 |
| 3,687,768 | 8/1972 | Vaitses et al. | 161/DIG. 4 |

Primary Examiner—George F. Lesmes
Assistant Examiner—James J. Bell

[57] ABSTRACT

A new and improved multi-ply fabric, and process for the manufacture of such fabric, particularly useful in boat building wherein the fabric must fit or assume the shape of compound-curved surfaces to suitably serve as a base or support for resin or liquefied plastics added thereon and cured or hardened as an initial step in the formation of, e.g., a fiberglass reinforced plastic boat hull. The fabric is characterized generally as of a two-ply construction embodying an upper and lower ply between which is "sandwiched" and secured a series of parallel aligned, spaced apart, springy elements of specific character between which can be placed yarns or rovings to impart tensile strength. The plies of the fabric, in a direction perpendicular to the springy elements, must be sufficiently pliable or flexible to permit some lateral or transverse movement, and also longitudinal movement, of the springy elements so that the fabric construction can assume compound-curved shapes.

10 Claims, 3 Drawing Figures

3,895,160

FABRIC CONSTRUCTIONS

The present application is a continuation-in-part of application Ser. No. 829,067, filed May 29, 1969, now U.S. Pat. No. 3,668,051 covering Method and Means of Manufacturing Compound-Curved Structures. The disclosure thereof is herewith referred to and fully incorporated in the present application.

FIELD OF THE INVENTION

This invention relates to multi-ply fabrics, or fabric constructions, useful for assuming the shapes of compound-curved objects on which they are placed as bases for support of resins or liquefied plastics added thereto and cured and hardened in the shape of the compound-curved objects as an initial step in the formation of laminated structures. The fabrics have particular utility in a process for the construction of fiberglass reinforced plastic boat hulls. The invention also relates to a method or process for the manufacture of these fabrics.

The above-mentioned application discloses a mono-ply fabric type of construction comprising a base of flexible, or pliable, sheeting material, e.g., a loosely woven textile fabric, on which a series of spaced apart elastic, resilient or springy elements are secured and aligned in parallel relationship, one element in relation to another. The base material is porous, and of necessity sufficiently pliable to permit transverse movement, and also limited longitudinal movement, of the springy elements, one in relation to another, so that the mono-ply fabric structure cab be fitted to a boat frame to assume its compound-curved shape and then secured thereto to serve as a base upon which resins and liquefied plastics can be applied as an initial step in forming a fiberglass reinforced boat hull. After the mono-ply fabric is so fitted, as disclosed in the application, by extending the fabric from keel to gunwhale, aligning the springy elements so that the major axis thereof is in a direction perpendicular to the alignment of the keel, the resinous or liquid plastic is then added in quantity sufficient to fill troughs between the springy elements. In a subsequent step, after the liquid plastic or resin has set and hardened, a mixture of laminating resin, talc and chopped fiberglass is brushed or otherwise applied and then rolled to produce a relatively smooth, strong shell substructure which is then sanded to remove the high spots.

Such mono-ply fabric has proven admirably suitable in forming boat structures, and such method of construction has added considerable flexibility in boat building, particularly as compared with prior art methods necessitating the use of molds, which of course do not become a part of the finished boat but rather serve as a means within which a fiberglass boat can be laid, constructed and then removed. While the use of molds in boat constructions yet offer some benefits, mold constructions, inter alia, are extremely costly, particularly where only a relatively few boats of given design are to be built. In other words, a mold is produced for use in constructing a single type boat. Change of design is not possible without changing the mold. The cost of the mold, however, must be added to the cost of the series of specific type boats constructed with a given mold, and hence the cost of the mold itself is added overhead or burden, particularly prohibitive where relatively few boats of a given design are to be constructed.

Until inception of the invention described in application Ser. No. 829,067, supra, little had been done to change boat building methods requiring mold constructions. Prior art methods generally involved use of molds, or form work which, after initial use to define the shape of the hull, was separated from the hull and did not become part of the finished boat construction. Previous attempts, if any, to manufacture boats without the use of molds, or forms which were separated from the boat after it had been formed, apparently have not been successful. For example, an attempt to form a boat construction wherein a type of fabric, which was to ulitmately become a part of the finished structure, is described, e.g., in U.S. Pat. No. 2,813,050 to William F. Hickman, issued Nov. 12, 1957. Pursuant to the disclosure of that patent, stiff wire mesh was used to cover a framework, basically conforming to the shape of a boat, over which a fabric or fiberglass matting was placed as a base, and then resin poured thereover, and permitted to harden. Layer after layer of the resin was applied and hardened until such time as the desired hull thickness had been obtained. The framework, after having imparted its basic curvature, shape of sides and bottom shape, was separated from the wire mesh-resinous structure. In some instances two layers of wire mesh were used with an intervening glass fiber matting, or the wire mesh was sandwiched between two layers of glass fiber matting. The surface of the precast hull containing the wire mesh, or meshes, was then buffed or ground for smoothness. This technique apparently has not proven successful, inter alia, because the structures so produced simply cannot withstand the frequently changing stresses, mechanical and thermal, to which a boat is necessarily subjected. The wire mesh, particularly under the stress of wave actions, has not proven to be an effective reinforcement. This is believed due to the relatively low surface area of the individual wire strands constituting the wire mesh relative to their cross-sectional area. The low ratio is simply not large enough to allow the wire to be effectively bonded into the plastic matrix with sufficient bond strength to keep the individual wires from being broken loose under stress. The metal wires, after breaking loose from the plastic matrix, are all too readily stressed beyond their elastic limit. The result of the break-down of the bond between the metal wires and the plastic matrix is crazing or fracturing of the laminate, and this can even result in permanent deformation of the hull structure.

Accordingly, among the objects of this invention are:

To obviate the foregoing and other prior art deficiencies by providing a new and improved fabric, and processes for the manufacture and use of such fabrics, in the construction of laminated structures of compound-curves and various other shapes.

To provide a new fabric construction suitable for use in boat constructions, which constructions can admirably and long withstand thermal and mechanic stresses, such as caused by weather and continuous wave actions.

To provide a new fabric, smooth on all faces, improved over that described in copending application Ser. No. 829,067, supra, which material is easy to manufacture at low cost.

These objects and others are achieved in accordance with the present invention comprising a multi-ply fabric, or fabric having a plurality of plied layers, including outer plied fabric layers of woven or nonwoven pliable or flexible materials, suitably fabric layers or yarns of fibrous textile materials between which is sandwiched a plurality or series of parallel aligned, spaced apart, elastic, resilient or springy elements. The latter, of elongate shape, are constituted of semi-rigid or rigid plastic or plastic-like materials, preferably hardened or cured resins reinforced by yarns or rovings, preferably glass rovings, to impart high tensile and flexual strength to the fabric. The mechanical properties of such fabric is excellent because, e.g., the fiber-resin or glass-resin ratio in the springy elements can be accurately controlled to provide high fiber or glass loadings and the reinforcement highly oriented and unidirectional in the direction where strength is needed. Preferably, yarns or rovings, more preferably glass rovings, are placed within the voids or spaces between the springy elements, and oriented in the same direction as the latter. These yarns or rovings not only add tensile strength to the fabric but also absorb or soak up applied resins and liquid plastics to prevent resin drip-through at the time such materials are initially applied.

Fibrous materials as used in the present invention are typically materials such as yarns or rovings constructed principally of fibers of average diameter no greater than about ten thousandths of an inch (10 mils), and preferably average fiber diameters range from about one thousandth of an inch (1 mil), and smaller, to about ten thousandths of an inch (10 mils). Preferably, the fibrous textile materials used in accordance with this invention are those having a tensile strength of at least about 200,000 pounds per square inch (psi), and preferably 300,000 psi, and higher.

The outer piles of the fabric, suitably loosely woven or nonwoven textile fabrics, on the one hand, must be sufficiently porous to permit passage of liquid plastic or resin to fill and saturate all of the void space between the fibers during use in construction. Complete wetthrough is essential. On the other hand, however, the plies of fabric should not be so porous as to permit ready pour-through of the resin or liquid plastic. The outer plies must be sufficiently pliable or flexible to permit transverse and longitudinal displacement of the springy elements so that the fabric can assume the form of compound-curved structures.

The fabric is particularly useful as a building base in forming compound-curved structures, and is particularly useful in boat constructions to produce boat hulls, decks, tanks, equipment lockers, cabins, and the like. Tanks can be formed without use of a mold, e.g., by wrapping the fabric circumferentially around a formwork and then saturating the fabric with liquid plastic or resin. The resin, upon hardening, can be further coated with additional layers of resin, fiberglass, and the like, as desired, to form a laminar structure of suitable thickness. A boat hull, e.g., can be similarly constructed by placing the fabric on a framework with the springy elements and unsaturated rovings aligned in the direction that strength is needed—viz., parallel to the direction of the keel. The new fabric is smooth on the outer faces, this lessening the necessity of sanding to provide a smooth surface upon which to apply further layers of plastic. It is also sufficiently porous to soak up applied resins and liquid plastics, but does not permit ready pour-through of these materials at the time of application.

Generally, upon completion of the laminated structure, the frame, e.g., boat hull, becomes an integral part of the object of the construction. In some instances, however, the laminated structure can be separated from the frame, and the latter used continuously, if desired, as a mold.

The invention, and its principle of operation, will be more fully understood by reference to the following detailed description of a specific embodiment, and to the attached drawings to which reference is made in the description. In the description, similar numbers are used to represent similar parts or components and, where subscripts are used in conjunction with numbers, the numbers are intended in generic sense to indicate a plurality of similar parts or components.

Figure 1:
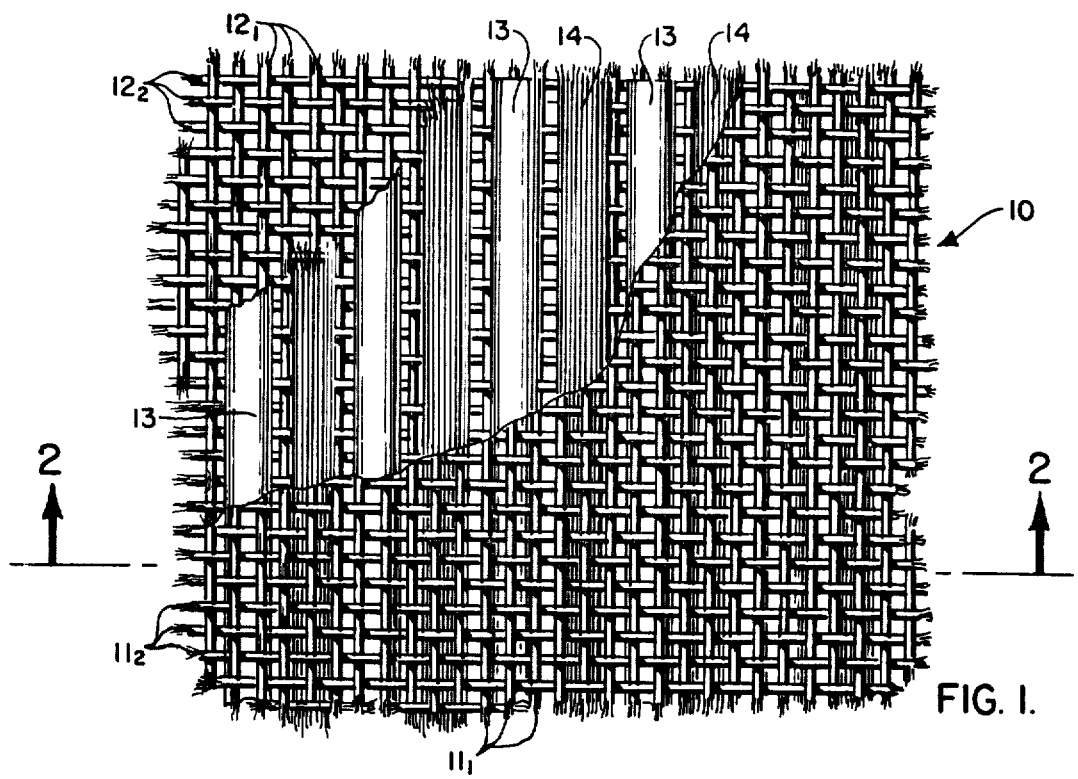
FIG. 1 is a top plan view, in partial section, of a representative segment of a multi-ply textile fabric construction in accordance with a preferred embodiment of this invention.
Figure 2:
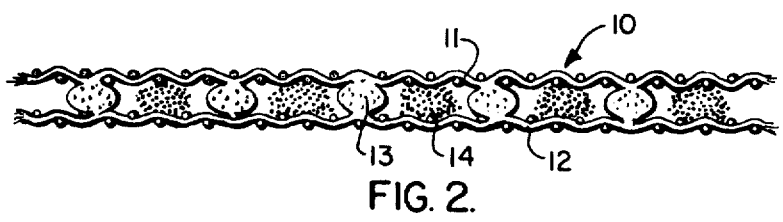
FIG. 2 is a section view taken along line 2—2 of FIG. 1.

Referring to FIGS. 1 and 2 there is shown a segment of two-ply fabric 10 embodying an upper ply 11 and lower ply 12, the upper ply 11 being comprised of warp yarns $11_1$ and filler yarns $11_2$ while the lower ply 12 is comprised of warp yarns $12_1$ and filler yarns $12_2$. The plies are necessarily of flexible or pliable material, such as a porous film or fabric. The fabric, where fabric is used, can be of woven or nonwoven textile materials. Suitably, the individual plies 11, 12, which can be the same or different, are formed of loosely woven textile yarns, of fibrous materials, and loosely woven in plain weave. The plies 11, 12 are separated and retained substantially parallel, one member with respect to the other, by a plurality or series of spaced apart elastic, resilient or springy elements 13 sandwiched between and, preferably, bonded to the individual plies. A series of rovings 14 is contained within the voids between the individual elements 13, the rovings imparting tensile strength to the fabric.

In its preferred form, the individual yarns of plies 11, 12 of fabric 10 can be constituted of virtually any fiber which is compatible with the resin coating to be applied and sufficiently pliable to permit substantially unimpeded or free displacement of the individual elements 13, including movement toward or away from one another, or in a direction lateral or transverse to the major axes of the said elements 13, but most particularly movement in a longitudinal direction. Thus, it is essential that the yarns which are transverse to the major axes of the elements 13, in this instance filler yarns $11_2$, $12_2$, be flexible to permit movement of the elements 13 in longitudinal direction which is essential in assuming, with the plies 11, 12, where necessary, a compound-curved shape. The warp yarns $11_1$, $11_2$ can also be flexible, if desired, the individual elements 13 being selected to provide the necessary stiffness in the longitudinal direction, or in the direction of the major axes of elements 13. Suitably, the yarns constituting plies 11, 12 are composed in whole or in part of natural or synthetic fibers such as cotton, rayon, Dacron, nylon, Orlon, acetate, Acrilan, Creslan, Dynel, Fortrel, Kodel, wool and the like. A yarn constructed in whole or in part of glass fibers, particularly the latter, is especially preferred.

The springy elements 13 are in the form of elongate members oriented in parallel relationship, one member relative to another. These elements 13 are suitably constructed of a solid, rigid or semi-rigid plastic, preferably hardened or cured resins within which are incorporated fibrous textile materials, suitably yarns or rovings. The high ratio of the surface area relative to the cross-sectional area of the individual fibers, which are thoroughly wetted by resin or liquid plastic and set, cured or hardened so that the individual fibers are strongly bonded together with the plastic which serves as a matrix for the fibers, provides sufficient strength to prevent the fibers from being pulled apart or broken loose one from another when the finished structure is subjected to great stress. The ability of this material to withstand great stress, e.g., is sharply contrasted with metal wire, which has not proven an effective reinforcement for structures subjected to high stresses, e.g., boat hulls. This is because wires have a low surface area relative to their cross-section and there is, inter alia, insufficient surface for the wire to be effectively bonded into a plastic matrix with adequate bond strength to prevent its being broken loose when the wire is stressed. Moreover, the tensile strength of available metals is inadequate and certainly far below that of available fibrous materials. Consequently, metal wires can be easily stressed beyond their elastic limit long before the more resilient reinforced plastic material within which the metal is embedded reaches its elastic limit. The result is a break-down of the bond between the metal and plastic, crazing and fracturing of the laminate and even possible permanent deformation of the hull structure. Furthermore, fibrous materials are far easier to work with than wire mesh, present a smooth surface, do not permit significant resin drip-through, provide a high strength-weight ratio, and the incorporation of fibers into the hull shell is advantageous in that there is no problem of corrosion or development of electrical and magnetic fields which is quite important in some usages.

Suitably, the springy elements 13 can be constructed of various thermosetting or thermoplastic plasticss or plastic-like materials. Exemplary of such plastic materials are polystyrene, polyethylene, polyvinyl chloride, polyvinylidene chloride, polyvinyl acetate, cellulose acetate, cellulose nitrate, cellulose acetobutyrate, ethyl cellulose and the like. The elements 13, in accordance with an especially desired technique, can be made by dipping or impregnating various yarns with resinous materials which, after setting or solidifying, by various suitable methods, form the desirable rigid or semi-rigid shapes. Glass roving is an especially preferred fibrous material for such use. For example, glass rovings, which add tensile strength to the elements 13 formed therefrom, can be sprayed, dipped or otherwise impregnated with various resins, shaped as desired, and the resin then solidified and hardened to form the said elements. Glass roving thus impregnated with various resins, e.g., epoxy resins, polyesters, phenolic or melamine resins, of the thermosetting type, in a preferred embodiment, can thus be heat set to form rigid shapes suitable for use as springy elements. By preplacement of the resin impregnated yarns of various types between the plies 11, 12 in desired orientation, the springy elements 13 can, in either event, be simultaneously bonded to the enveloping plies 11, 12 at the time of setting.

The elements 13, as stated, are spaced apart in parallel orientation, leaving voids or pockets which are filled with yarn or rovings 14, the function of which is to impart tensile strength to the fabric and lessen drip-through. In a construction, therefore, the fabric 10 is preferably laid so that the rovings 14 (and consequently also the major axes of the springy elements 13) are aligned in the direction that the greatest tensile strength is needed. For example, in a boat construction, the rovings 14 and springy elements 13 are aligned in the same direction as the keel, this being the direction of greatest stress produced by wave actions when the boat is in use. In construction of a cylindrical shaped water tank, for example, the fabric 10 would be placed so that the rovings 14, and the major axes of the springy elements 13, are wrapped circumferentially about the cylindrical frame on which a tank is to be formed. Virtually any fibrous material of good strength, and compatible with the resin matrix to be formed upon the fabric 10, is suitable for use as rovings. Exemplary of such materials are fiberglass, carbon fiber, graphite fiber, boron filaments, and high strength organic fibers such as Dupont's PVR-49 and the like. Fiberglass rovings have been found particularly satisfactory.

Figure 3:
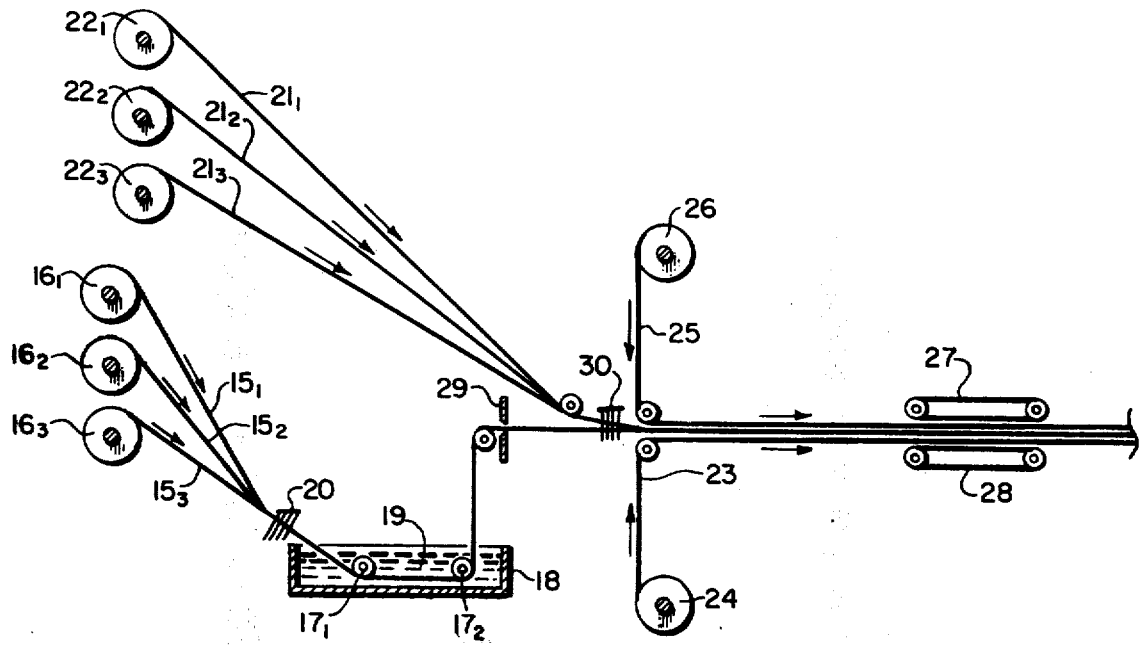
FIG. 3 is a schematic or diagrammatic view of apparatus and process useful in forming the multi-ply fabric construction depicted in the two preceding figures.

A preferred method for manufacture of a suitable and preferred type of fabric 10 is illustrated by specific reference to FIG. 3. A plurality of parallel strands of roving $15_1$, $15_2$, $15_3$ (e.g., 211 yards/pound continuous filament fiberglass) are unwound from a parallelly arranged series of rolls $16_1$, $16_2$, $16_3$ and the individual strands brought together and immersed within a resin 19 (e.g., a polyester laminating resin) by passage across rolls $17_1$, $17_2$ of bath 18. The series of parallel strands 15, brought together and consolidated by passage through a comb 20, is wet with resin, and formed into round cross-sections (e.g., of seven sixty-fourths diameter). These resin-saturated strands 15, in alternate series with similarly parallelly aligned unsaturated strands of rovings 21 (e.g., 211 yards/pound continuous filament fiberglass), unwound from rolls $22_1$, $22_2$, $22_3$ are directed through orifice 29 and comb 30, and then brought toward and rested upon a single ply woven fiberglass scrim fabric 23 (e.g., 3 mil strands, approximately 20 picks to the inch) which is unwound from roll 24. The series of strands 15, oriented in parallel relationship one to another, aligned and spaced, e.g., 5/16 inch apart (measured from center to center), between which lie strands 21, are sandwiched between a single ply scrim fabric 25 (similar to scrim fabric 23) unwound from roll 26. This structure is then pressed lightly between two heated, Teflon coated plates or Teflon coated endless belts 27, 28 to assure good contact between the fabric 23, 25 and strands 15. The applied heat cures the resin, this producing flexible reinforced plastic, or springy elements bonded between two plies of fiberglass scrim fabric. The unbound reinforcing rovings 21 lie between the springy elements which are formed from resin coated strands 15.

It is understood, of course, that the degree of heat required to bond together the plies of fabric and resin-impregnated rovings will vary, and different time-temperature relationships will be required for different materials. Also, while pressing is especially preferred, various wet or dry methods known to the art might be used to effect the cure. In general, a temperature ranging from about 200° to about 400°F. is adequate in most cases to effect the cure. Generally, also, a time duration of from about 3 to 5 minutes is adequate to transfer sufficient heat to the fabric and resin and provide curing.

Having described the invention, what is claimed is:

1. As an article of manufacture, a fabric construction of at least two plies, characterized as outer plies, between which is sandwiched a series of spaced-apart, parallel aligned, springy plastic elements of elongate shape, each element constructed and reinforced with fibers impregnated with resin and cured to form a semi-rigid or rigid material, and each of which is bonded to the outer plies, the voids between adjacent elements containing fibers as yarns or rovings, the plies transverse to the major axes of the springy elements being sufficiently pliable to permit displacement of the springy elements directionally one toward another and into the voids between adjacent elements, and to permit longitudinal displacement of the said elements so that the fabric construction can cover and assume the shape of a compound-curved structure.

2. The article of manufacture of claim 1 wherein the springy plastic elements are constructed of textile fibers impregnated with resin and cured to form a semi-rigid or rigid material.

3. The article of manufacture of claim 1 wherein the springy plastic elements are constructed of an admixture of resin and a material selected from the group consisting of fiberglass fibers, carbon fibers, graphite fibers, boron filaments and high strength organic fibers, cured to form a semi-rigid or rigid material.

4. The article of manufacture of claim 2 wherein the fibers have a tensile strength of at least about 200,000 p.s.i.

5. The article of manufacture of claim 2 wherein the fibers have an average cross-sectional diameter of no more than about 10 mils.

6. The article of manufacture of claim 1 wherein voids between the elongate plastic elements contain textile fibers, aligned in the same direction as the elongate plastic elements.

7. The article of manufacre of claim 6 wherein the fibers are selected from the group consisting of fiberglass fibers, carbon fibers, graphite fibers, boron filaments and high strength organic fibers.

8. The article of manufacture of claim 6 wherein the fibers have a tensile strength of at least about 200,000 p.s.i.

9. The article of manufacture of claim 6 wherein the fibers have an average cross-sectional diameter of no more than about 10 mils.

10. The article of manufacture of claim 1 wherein the outer plies are constructed of loosely woven fabric bonded to the elongate plastic elements.

* * * * *